United States Patent
Zhamu et al.

(10) Patent No.: US 8,691,441 B2
(45) Date of Patent: Apr. 8, 2014

(54) GRAPHENE-ENHANCED CATHODE MATERIALS FOR LITHIUM BATTERIES

(75) Inventors: Aruna Zhamu, Centerville, OH (US); Jinjun Shi, Hilliard, OH (US); Guorong Chen, Fairborn, OH (US); Ming C. Wang, Fairborn, OH (US); Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 234 days.

(21) Appl. No.: 12/807,471

(22) Filed: Sep. 7, 2010

(65) Prior Publication Data

US 2012/0058397 A1    Mar. 8, 2012

(51) Int. Cl.
*H01M 4/583* (2010.01)
*H01M 4/587* (2010.01)
*B82Y 30/00* (2011.01)
*H01B 1/24* (2006.01)

(52) U.S. Cl.
CPC .............. *H01M 4/587* (2013.01); *Y02E 60/122* (2013.01); *B82Y 30/00* (2013.01); *H01B 1/24* (2013.01)
USPC .................. 429/231.8; 429/218.1; 429/231.9; 429/231.95; 252/502; 252/506

(58) Field of Classification Search
CPC .............................. H01M 4/587; Y02E 60/122
USPC ...................... 429/218, 231.8, 231.9, 231.95; 252/502, 506
See application file for complete search history.

(56) References Cited

U.S. PATENT DOCUMENTS

| 2,798,878 A | 7/1957 | Hummers | |
| 2010/0143798 A1* | 6/2010 | Zhamu et al. | 429/212 |
| 2011/0287316 A1* | 11/2011 | Lu et al. | 429/215 |

OTHER PUBLICATIONS

U.S. Appl. No. 12/009,259, filed Jan. 18, 2008, Zhamu, et al.

\* cited by examiner

*Primary Examiner* — Patrick Ryan
*Assistant Examiner* — Ladan Mohaddes
(74) *Attorney, Agent, or Firm* — Mark Levy; Thompson Hines, LLP

(57) ABSTRACT

A nano graphene-enhanced particulate for use as a lithium battery cathode active material, wherein the particulate is formed of a single or a plurality of graphene sheets and a plurality of fine cathode active material particles with a size smaller than 10 μm (preferably sub-micron or nano-scaled), and the graphene sheets and the particles are mutually bonded or agglomerated into an individual discrete particulate with at least a graphene sheet embracing the cathode active material particles, and wherein the particulate has an electrical conductivity no less than $10^{-4}$ S/cm and the graphene is in an amount of from 0.01% to 30% by weight based on the total weight of graphene and the cathode active material combined.

33 Claims, 9 Drawing Sheets

Cycle No. 1-10 (0.1 C rate); No. 11-20 (0.5 C); No. 21-30 (2 C)

GRAPHENE-ENHANCED CATHODE MATERIALS FOR LITHIUM BATTERIES

This invention is based on research results of a project supported by the US NSF SBIR-STTR Program.

FIELD OF THE INVENTION

The present invention relates generally to the field of lithium metal or lithium ion batteries and, in particular, to a nano graphene-enhanced cathode of a lithium metal battery or lithium-ion battery.

BACKGROUND OF THE INVENTION

Due to extremely poor electrical conductivity of all cathode active materials in a lithium-ion or lithium metal cell, a conductive additive (e.g. carbon black, fine graphite particles, expanded graphite particles, or their combinations), typically in the amount of 2%-15%, must be added into the electrode. However, the conductive additive is not an electrode active material. The use of a non-active material means that the relative proportion of an electrode active material, such as $LiFePO_4$, is reduced or diluted. For instance, the incorporation of 5% by weight of PVDF as a binder and 5% of carbon black as a conductive additive in a cathode would mean that the maximum amount of the cathode active material (e.g., lithium cobalt oxide) is only 90%, effectively reducing the total lithium ion storage capacity. Since the specific capacities of the more commonly used cathode active materials are already very low (140-170 mAh/g), this problem is further aggravated if a significant amount of non-active materials is used to dilute the concentration of the active material.

State-of-the-art carbon black (CB) materials, as a conductive additive, have several drawbacks:

(1) CBs are typically available in the form of aggregates of multiple primary particles that are typically spherical in shape. Due to this geometric feature (largest dimension-to-smallest dimension ratio or aspect ratio~1) and the notion that CBs are a minority phase dispersed as discrete particles in an electrically insulating matrix (e.g. lithium cobalt oxide and lithium iron phosphate), a large amount of CBs is required to reach a percolation threshold where the CB particles are combined to form a 3-D network of electron-conducting paths.

(2) CBs themselves have a relatively low electrical conductivity and, hence, the resulting electrode remains to be of relatively low conductivity even when the percolation threshold is reached. A relatively high proportion of CBs (far beyond the percolation threshold) must be incorporated in the cathode to make the resulting composite electrode reasonably conducting.

Clearly, an urgent need exists for a more effective electrically conductive additive material. Preferably, this electrically conductive additive is also of high thermal conductivity. Such a thermally conductive additive would be capable of dissipating the heat generated from the electrochemical operation of the Li-ion battery, thereby increasing the reliability of the battery and decreasing the likelihood that the battery will suffer from thermal runaway and rupture. With a high electrical conductivity, there would be no need to add a high proportion of conductive additives.

There have been several attempts to use other carbon nano-materials than carbon black (CB) or acetylene black (AB) as a conductive additive for the cathode of a lithium battery. These include carbon nano-tubes (CNTs), vapor-grown carbon nano-fibers (VG-CNFs), and simple carbon coating on the surface of cathode active material particles. The result has not been satisfactory and hence, as of today, carbon black and artificial graphite particles are practically the only two types of cathode conductive additives widely used in lithium ion battery industry. The reasons are beyond just the obvious high costs of both CNTs and VG-CNFs. The difficulty in disentangling CNTs and VG-CNFs and uniformly dispersing them in a liquid or solid medium has been an impediment to the more widespread utilization of these expensive materials as a conductive additive. For the less expensive carbon coating, being considered for use in lithium iron phosphate, the conductivity of the carbon coating (typically obtained by converting a precursor such as sugar or resin via pyrolyzation) is relatively low. It would take a graphitization treatment to render the carbon coating more conductive, but this treatment requires a temperature higher than 2,000° C., which would degrade the underlying cathode active material (e.g., $LiFePO_4$).

As an alternative approach, Ding, et al investigated the electrochemical behavior of $LiFePO_4$/graphene composites [Y. Ding, et al. "Preparation of nano-structured $LiFePO_4$/graphene composites by co-precipitation method," Electrochemistry Communications 12 (2010) 10-13]. The co-precipitation method leads to the formation of $LiFePO_4$ nano-particles coated on the surfaces of graphene nano-sheets. The cathode is then prepared by stacking these $LiFePO_4$-coated graphene sheets together. This approach has several major drawbacks: (1) With the two primary surfaces of a graphene sheet heavily loaded with $LiFePO_4$ nano-particles, the resulting electrode entails many insulator-to-insulator contacts between two adjoining coated sheets in a stack. (2) With both $LiFePO_4$ particles and graphene sheets being nano-scaled (single-layer graphene is as thin as 0.34-1.0 nm), the coated sheets are also nano-scaled, making the preparation of electrodes very difficult. The $LiFePO_4$ nano particles are notoriously difficult to be compacted into cathodes of desired dimensions using the current battery production equipment. We have found that the nano particle-coated nano graphene sheets as prepared by the co-precipitation method are not amenable to fabrication of cathodes with the same equipment as well. In particular, these coated nano graphene sheets could not be compacted into a dense state with a high mass per unit electrode volume. In other words, the cathode tap density is relatively low. This is a very serious issue since all of the commonly used cathode active materials, including $LiFePO_4$, already have a very low specific capacity (mAh/g), and not being able to pack a large mass of a cathode active material into a given electrode volume would mean an excessively low overall capacity at the cathode side. (It may be noted that the typical specific capacity (140-170 mAh/g) of a cathode active material is already much lower than that (330-360 mAh/g) of an anode active material. Such an imbalance has been a major issue in the design and fabrication of lithium ion batteries.) This issue has been completely ignored by Ding, et al.

Thus, it is an object of the present invention to provide a thermally and electrically conductive additive that can be easily incorporated in a cathode of a lithium battery.

A specific object of the present invention is to provide a conductive additive that is capable of helping multiple primary particles of a cathode active material to aggregate into secondary particles (herein referred to as particulates) that are more amenable to mass production of cathodes using current production equipment. In other words, the conductive additive is also a modifier for other properties of an electrode.

A particularly desirable specific object of the present invention is to provide a conductive additive or modifier that is capable of helping multiple primary particles of a cathode active material aggregate into secondary particles that are more conducive to the formation of a 3-D network of electron-conducting paths, imparting exceptional conductivity to the cathode and enabling the cathode to become high-rate capable.

SUMMARY OF THE INVENTION

This invention provides a nano graphene-enhanced particulate for use as a lithium battery cathode active material. The particulate is formed of a single or a plurality of graphene sheets and a plurality of fine cathode active material particles (primary particles) with a size smaller than 10 μm (preferably smaller than 1 μm and further preferably <100 nm). The graphene sheets and the primary particles are mutually bonded or agglomerated into the particulate (also referred to as a secondary particle) with at least a graphene sheet embracing the cathode active material particles. The particulates have an electrical conductivity no less than $10^{-4}$ S/cm (typically and preferably greater than $10^{-2}$ S/cm). The graphene component is in an amount of from 0.01% to 30% by weight (preferably between 0.1% to 20% by weight and more preferably between 0.5% and 10%) based on the total weight of graphene and the cathode active material combined. Preferably, the particulate is approximately spherical in shape.

The graphene sheet used in the particulate preferably comprises single-layer graphene or few-layer graphene, wherein the few-layer graphene is denied as a graphene platelet formed of less than 10 graphene planes.

Preferably, the cathode active material is selected from the group consisting of lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphates, metal sulfides, and combinations thereof. The cathode active material particles (primary particles) in the particulate (secondary particle) preferably have a dimension smaller than 1 μm and further preferably smaller than 100 nm. Smaller dimensions promote shorter lithium diffusion times and faster battery charge and discharge rates.

A particularly desirable group of cathode active materials consists of lithium iron phosphate, lithium manganese phosphate, lithium vanadium phosphate, lithium mixed metal phosphates, and combinations thereof, wherein the cathode active material contains sub-micron or nano-scaled particles with a size less than 1 μm, preferably <100 nm. This class of cathode active materials is relatively safe and is a preferred class of cathode active materials in the lithium ion batteries for electric vehicle applications.

Optionally, the particulate further comprises a carbon material in electronic contact with the cathode active material and a graphene sheet. This carbon material can be a polymeric carbon, amorphous carbon, chemical vapor deposition (CVD) carbon, carbon black (CB), acetylene black (AB), activated carbon, fine expanded graphite particle with a dimension smaller than 100 nm, artificial graphite particle, and/or natural graphite particle. Preferably, the carbon material is coated on at least one of the cathode active material particles and more preferably on the surface of all primary particles, which are then embraced by a graphene sheet or a plurality of graphene sheets.

Another preferred embodiment of the present invention is a process for producing the aforementioned graphene-enhanced particulate. The process comprises (a) preparing a precursor mixture of graphene or graphene precursor with a cathode active material or active material precursor; and (b) thermally and/or chemically converting the precursor mixture to the graphene-enhanced cathode particulate. The step of preparing a precursor mixture preferably comprises preparing a suspension of graphene or graphene precursor in a liquid medium and mixing a cathode active material or active material precursor in the suspension to form a multi-component suspension. The process preferably further comprises a step of drying the multi-component suspension to form the precursor mixture preferably using a spray-drying, spray-pyrolysis, or fluidized-bed drying procedure. This drying step is typically followed by a step of converting, which can involve a sintering, heat-treatment, spray-pyrolysis, or fluidized bed drying or heating procedure. The step of converting may also comprise a procedure of chemically or thermally reducing the graphene precursor to reduce or eliminate oxygen content and other non-carbon elements of the graphene precursor. Most preferably, the final heat treatment or sintering of the precursor to the cathode active material (e.g., $LiFePO_4$) is conducted concurrently with the thermal reduction step of graphene precursor (e.g. graphene oxide). Both treatments can be conducted at 700° C., for instance.

A commonly used chemical method of producing graphene involves producing graphene oxide (GO) or graphene fluoride first, which is then chemically or thermally reduced to graphene. The graphene sheets in the graphene-enhanced particulate typically have an oxygen content less than 25% by weight and can have an oxygen content less than 5% by weight. Most typically, the graphene sheet has an oxygen content in the range of 5% to 25% by weight.

The step of preparing the precursor mixture may comprise: A) dispersing or exposing a laminar graphite material in a fluid of an intercalant and/or an oxidant to obtain a graphite intercalation compound (GIC) or graphite oxide (GO); B) exposing the resulting GIC or GO to a thermal shock at temperature for a period of time sufficient to obtain exfoliated graphite or graphite worms; C) dispersing the exfoliated graphite or graphite worms in a liquid medium containing an acid, an oxidizing agent, and/or an organic solvent at a desired temperature for a duration of time until the exfoliated graphite is converted into a graphene oxide dissolved in the liquid medium to form a graphene solution; D) adding a desired amount of the cathode precursor material to the graphene solution to form the precursor mixture in a suspension, slurry or paste form.

Alternatively, the step of preparing the precursor mixture comprises: (a) preparing a suspension containing pristine nano graphene platelets (NGPs) dispersed in a liquid medium; (b) adding an acid and/or an oxidizing agent into the suspension at a temperature for a period of time sufficient to obtain a graphene solution or suspension; and (c) adding a desired amount of cathode active material or precursor in the graphene solution or suspension to form a paste or slurry.

Another preferred embodiment of the present invention is a lithium battery cathode comprising multiple nano graphene-enhanced cathode particulates as described above. Typically, in a lithium ion battery featuring a cathode comprising multiple nano graphene-enhanced particulates of the present invention, these multiple particulates are typically packed together with graphene sheets forming a three-dimensional electron-conducting pathway.

Yet another preferred embodiment of the present invention is a lithium battery (a lithium metal battery or lithium ion battery) comprising an anode, a cathode of the present invention, a separator disposed between the anode and the cathode, and electrolyte in physical contact with both the anode and the cathode.

DETAILED DESCRIPTION OF PREFERRED EMBODIMENTS

Figure 1:
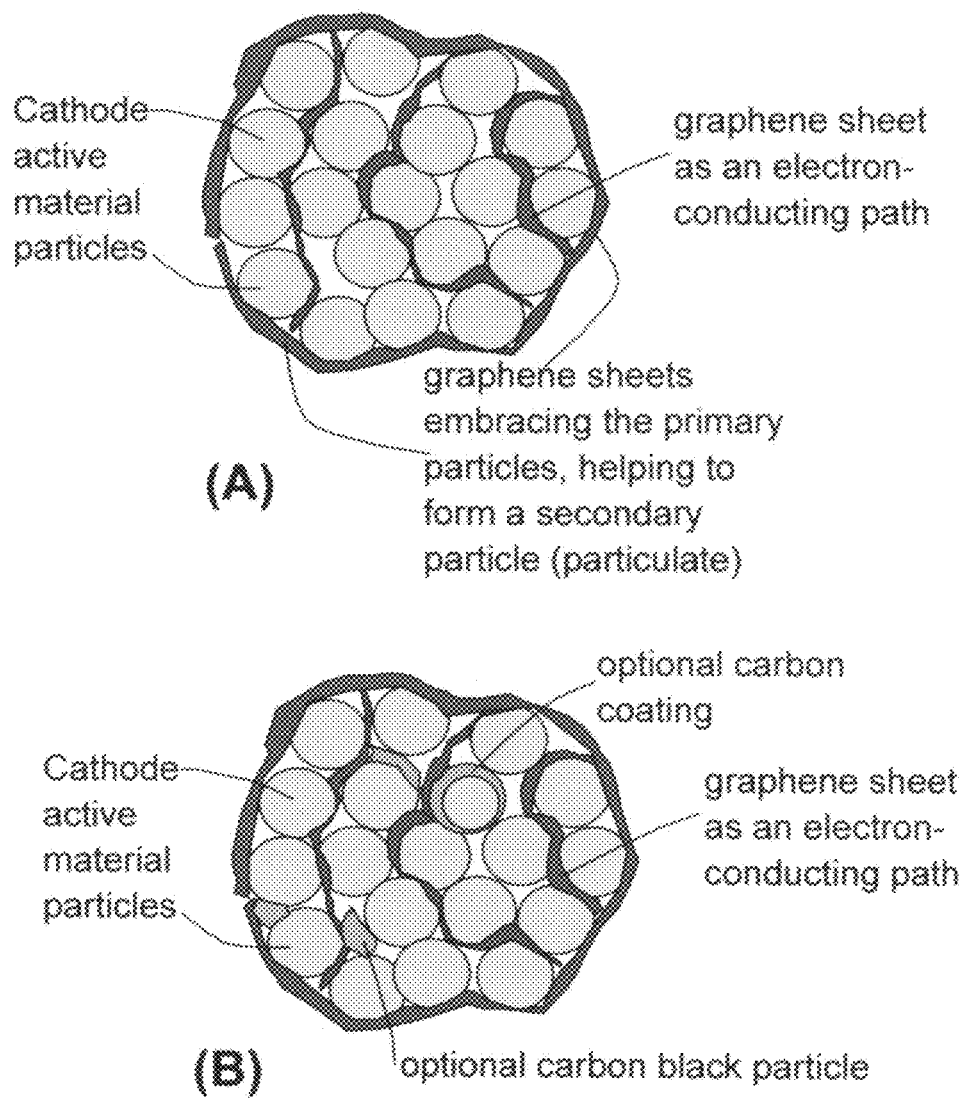
FIG. 1 (A) Schematic of a graphene-enhanced particulate according to a preferred embodiment of the present invention and (B) another particulate according to another preferred embodiment of the present invention (containing some carbon component).

This invention provides a nano graphene-enhanced particulate for use as a lithium battery cathode active material. As illustrated in FIG. 1(A), the particulate is formed of a single or a plurality of graphene sheets and a plurality of fine cathode active material particles (primary particles) with a size smaller than 10 µm (preferably smaller than 1 µm and further preferably <100 nm). The graphene sheets and the primary particles are mutually bonded or agglomerated into the particulate (also referred to as a secondary particle) with at least a graphene sheet embracing the cathode active material particles. Some graphene sheets get incorporated into the interior of the particulate, providing additional electron-conducting paths. FIG. 1(B) shows another preferred embodiment, wherein an additional conductive additive (such as carbon black particles and/or carbon coating) is incorporated in the particulate.

The resulting particulate typically has an electrical conductivity no less than $10^{-4}$ S/cm (typically and preferably greater than $10^{-2}$ S/cm). The graphene component is in an amount of from 0.01% to 30% by weight (preferably between 0.1% to 20% by weight and more preferably between 0.5% and 10%) based on the total weight of graphene and the cathode active material combined. With the processes herein invented and reported, the particulates tend to be approximately spherical in shape, which is a desirable feature.

A nano graphene platelet (NGP) or nano graphene sheet is composed of one basal plane (graphene plane) or multiple basal planes stacked together in the thickness direction. In a graphene plane, carbon atoms occupy a 2-D hexagonal lattice in which carbon atoms are bonded together through strong in-plane covalent bonds. In the c-axis or thickness direction, these graphene planes may be weakly bonded together through van der Waals forces. An NGP can have a platelet thickness from less than 0.34 nm (single layer) to 100 nm (multi-layer). For the present electrode use, the preferred thickness is <10 nm and most preferably <3 nm or 10 layers). The presently invented graphene-enhanced particulate preferably contains mostly single-layer graphene, but could make use of some few-layer graphene (less than 10 layers). The graphene sheet may contain a small amount (typically <25% by weight) of non-carbon elements, such as hydrogen, fluorine, and oxygen, which are attached to an edge or surface of the graphene plane. Graphene was recently discovered to exhibit the highest thermal conductivity of all existing materials. In addition to the electrical conductivity, this high thermal conductivity is clearly an advantageous property that could not be achieved by any other type of conductive additives.

Graphene sheets may be oxidized to various extents during their preparation, resulting in graphite oxide (GO) or graphene oxide. Hence, in the present context, graphene preferably or primarily refers to those graphene sheets containing no or low oxygen content; but, they can include GO of various oxygen contents. Further, graphene may be fluorinated to a controlled extent to obtain graphite fluoride.

As a preferred embodiment, the process of producing graphene-enhanced particulates comprises (i) preparing a precursor mixture of graphene or graphene precursor with a cathode active material or a precursor to the active material; and (ii) thermally and/or chemically converting the precursor mixture to the graphene-enhanced cathode particulate. Described in more detail, the process entails:

(a) dispersing or immersing a laminar graphite material (e.g., graphite powder) in a mixture of an intercalant and an oxidant (e.g., concentrated sulfuric acid and nitric acid, respectively) to obtain a graphite intercalation compound (GIC) or graphite oxide (GO);

(b) exposing the resulting GIC or GO to a thermal shock, preferably in a temperature range of 600-1,100° C. for a short period of time (typically 15 to 60 seconds), to obtain exfoliated graphite or graphite worms; and (c) dispersing exfoliated graphite in a liquid (e.g. water) and mechanically separating individual nano graphene platelets or sheets from graphite worms using, for instance, a high-shear mixer or an ultrasonicator to obtain a graphene or graphene precursor suspension; or, alternatively, (d) re-dispersing the exfoliated graphite to a liquid medium containing an acid (e.g., sulfuric acid), an oxidizing agent (e.g. nitric acid), or an organic solvent (e.g., NMP) at a desired temperature for a duration of time until the exfoliated graphite is converted into graphene oxide or graphene dissolved in the liquid medium. The acid is preferably a weak acid (such as diluted sulfuric acid) or a more environmentally benign acid, such as formic acid, acetic acid, citric acid, carboxylic acid, and combinations thereof. The exfoliated graphite, when dispersed in these acids, was gradually dispersed and essentially dissolved to form a graphene or graphene oxide solution or suspension. Although not a required operation, stirring, mechanical shearing, or ultrasonication can be used to accelerate the dispersion and dissolution step;

(e) dispersing a cathode active material or a precursor to a cathode active material to the graphene or graphene precursor solution or suspension prepared in step (c) or step (d) to obtain a precursor mixture suspension; and (f) thermally and/or chemically converting the precursor mixture to the graphene-enhanced cathode particulate.

An optional, but desirable intermediate step between (e) and (f) involves drying the suspension to form the precursor mixture in a solid state. If the precursor mixture contains a precursor to a cathode active material (e.g., un-sintered $LiFePO_4$ precursor), the mixture will be thermally heated (sintered) to obtain the particulates that contain primary $LiFePO_4$ particles therein (e.g., at 700° C.). If the precursor mixture contains a precursor to graphene (e.g. graphene oxide), then the precursor may be subjected to a chemical or thermal oxidation. A heat treatment at a temperature of preferably 500-1,000° C. for 1-2 hours would serve to eliminate a majority of the oxygen content from the graphene sheets. Coincidentally, the thermal reduction of graphene oxide and the thermal sintering of the $LiFePO_4$ precursor may be conducted concurrently under similar heat treatment conditions.

The carboxylic acid used in step (d) may be selected from the group consisting of aromatic carboxylic acid, aliphatic or cycloaliphatic carboxylic acid, straight chain or branched chain carboxylic acid, saturated and unsaturated monocarboxylic acids, dicarboxylic acids and polycarboxylic acids that have 1-10 carbon atoms, alkyl esters thereof, and combinations thereof. Preferably, the carboxylic acid is selected from the group consisting of saturated aliphatic carboxylic acids of the formula $H(CH_2)_n COOH$, wherein n is a number of from 0 to 5, including formic, acetic, propionic, butyric, pentanoic, and hexanoic acids, anydrides thereof, reactive carboxylic acid derivatives thereof, and combinations thereof. The most preferred carboxylic acids are formic acid and acetic acid.

In step (e), carbon black particles may be added along with the cathode active material particles. Alternatively, the cathode active material particles may be coated with a thin layer of carbon before they are mixed with the graphene suspension. For instance, micron-, sub-micron, or nano-scaled $LiFePO_4$ particles may be mixed into a solution containing a carbon precursor (e.g. sugar in water or phenolic resin in a solvent). The liquid component is then removed from the resulting mixture suspension or paste to obtain sugar- or resin-coated $LiFePO_4$ particles. These coated particles are then heat-treated at a temperature of 500-1,000° C. to obtain carbon-coated particles. These particles are then added to the graphene solution or suspension.

Figure 2A:
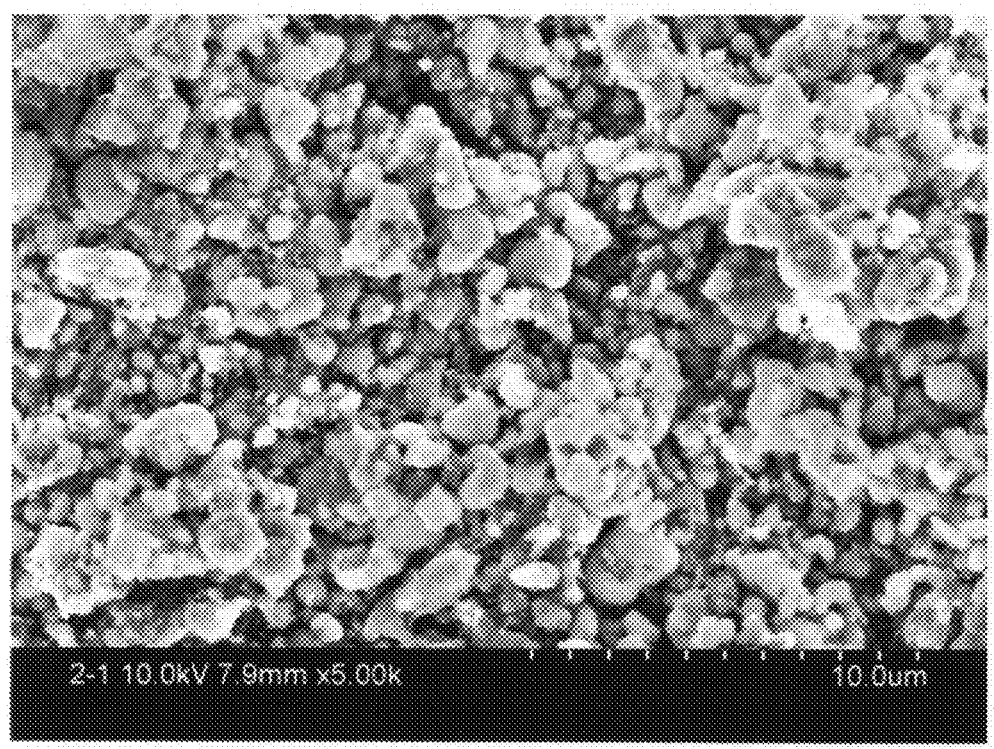
FIG. 2 SEM images of (A) primary LiFePO$_4$ particles without graphene and (B) graphene-enhanced particulates comprising graphene sheets in and around the particulate. Graphene sheets embrace and protect the primary particles to form secondary particles (particulates) that are easier to handle in a real cathode production environment.
Figure 2B:
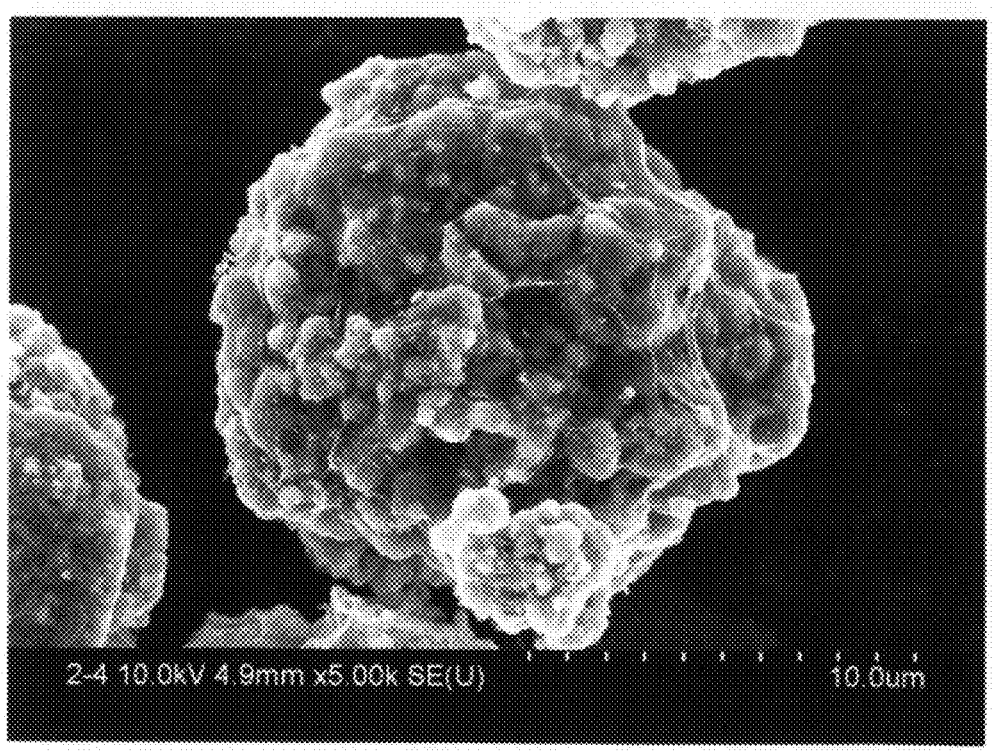

FIG. 2(A) shows an SEM image of primary $LiFePO_4$ particles without graphene and FIG. 2(B) shows graphene-enhanced particulates comprising graphene sheets in and around the particulate. Graphene sheets embrace and protect the primary particles to form secondary particles (particulates) that are easier to handle in a real cathode production environment. The notion that the exterior surface is embraced with highly conductive graphene sheets implies that these sheets can naturally form a 3-D network of electron-conducting paths when multiple particulates are packed together in a cathode.

Figure 3:
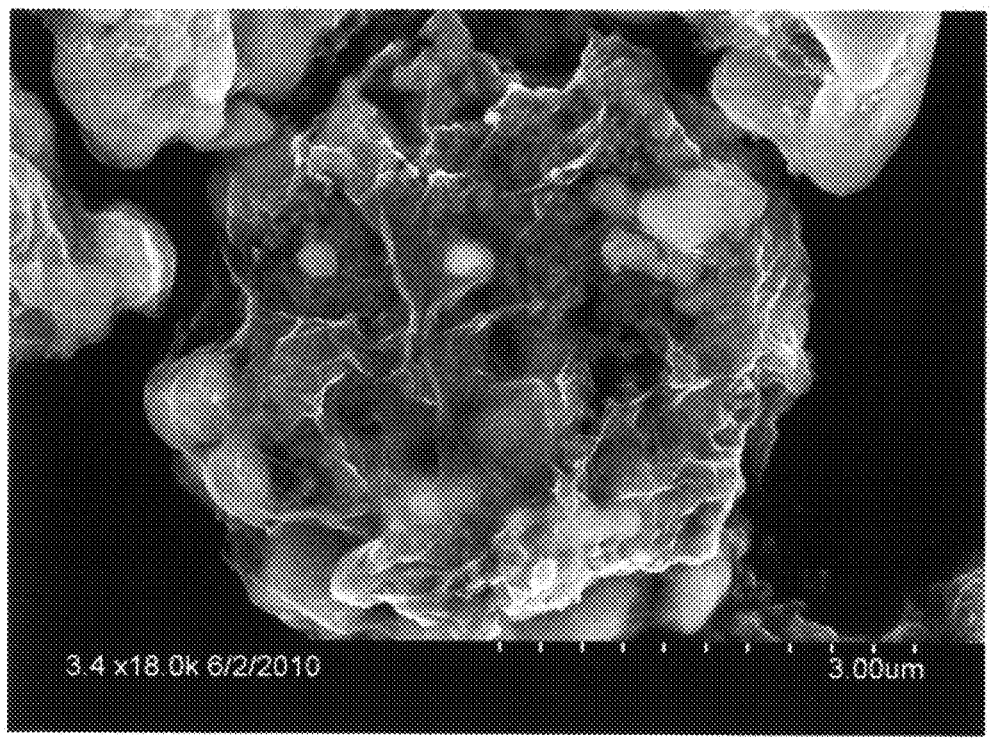
FIG. 3 SEM image of graphene-enhanced particulates containing therein carbon-coated LiFePO$_4$ particles embraced by graphene sheets.
Figure 4A:
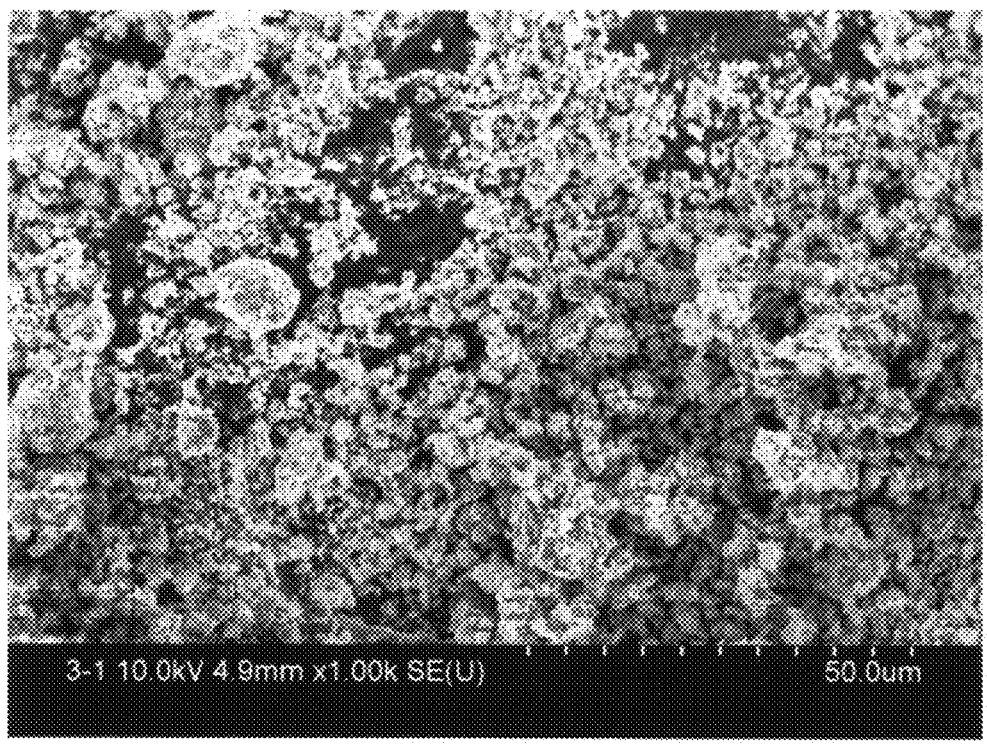
FIG. 4 Additional SEM images, at a lower magnification, of (A) primary LiFePO$_4$ particles without graphene (indicating a very broad particle size distribution containing many ultra-fine particles that are not amenable to easy fabrication of a cathode with a high tap density) and (B) graphene-enhanced particulates comprising graphene sheets in and around the particulate. Graphene sheets embrace and protect the primary particles to form secondary particles (particulates) that are more uniform in particle sizes and are larger in average size (~10 µm) than the primary particles.
Figure 4B:
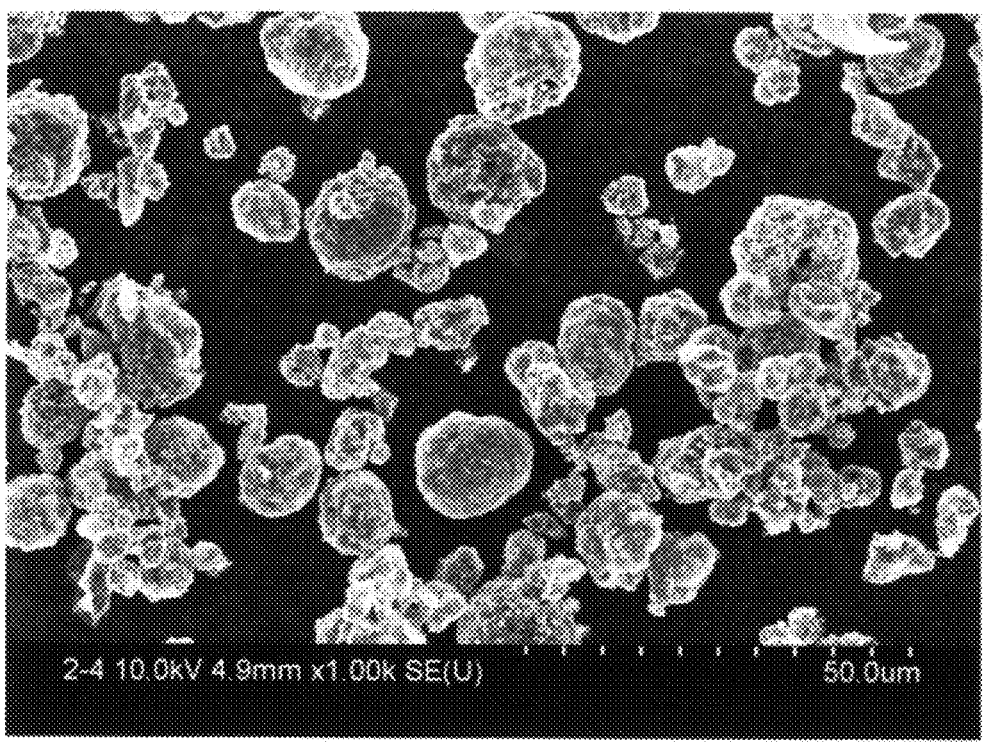

FIG. 3 shows an SEM image of graphene-enhanced particulates containing therein carbon-coated $LiFePO_4$ particles embraced by graphene sheets. FIG. 4(A) shows additional SEM image, at a lower magnification, of primary $LiFePO_4$ particles without graphene. This image indicates the presence of a very broad particle size distribution containing many ultra-fine particles that are not amenable to easy fabrication of a cathode with a high tap density. FIG. 4(B) shows an SEM image of graphene-enhanced particulates comprising graphene sheets in and around the particulate. Graphene sheets embrace and protect the primary particles to form secondary particles (particulates) that are more uniform in particle sizes and are larger in average size (~10 µm) than the primary particles. These particle sizes were conducive to electrode production using existing production equipment and were found to lead to cathodes that have a higher tap density (weight per volume of the electrode), which is a very important parameter for a cathode.

As another preferred embodiment, the process may begin with the production of a precursor solution or suspension of pristine graphene (non-oxidized graphene) directly from graphite particles, which is followed by the addition of a cathode active material or precursor to the cathode active material to this solution or suspension to obtain a precursor mixture. The production of a precursor solution or suspension may include the following steps:

(a) Preparing a suspension containing pristine nano graphene platelets (NGPs) dispersed in a liquid medium using, for instance, direct ultrasonication (e.g., a process disclosed by us in U.S. patent application Ser. No. 11/800,728 (May 8, 2007));

(b) Optionally removing some of the liquid from the suspension;

(c) Adding a desired amount of a cathode active material or a precursor to a cathode active material to obtain a precursor mixture suspension or solution;

(d) Removing the liquid from the suspension to obtain a precursor mixture solid; and (e) Thermally and/or chemically converting the precursor mixture solid to the graphene-enhanced cathode particulate.

For the preparation of a cathode, multiple graphene-enhanced particulates are mixed with a binder solution (e.g., PVDF in NMP) to obtain a slurry or paste. A desired amount of the slurry or paste is then coated onto a current collector, allowing the liquid to evaporate and leaving behind an electrode bonded to a surface of a current electrode. For examples, lithium cobalt oxide particles embraced by graphene sheets may be added to a solution containing a solvent (NMP). The resulting paste may be coated onto an aluminum foil as a current collector to form a coating layer of 50-500 µm thick. By allowing the solvent to vaporize one obtains a positive electrode (cathode) for a lithium battery.

In the aforementioned examples, the starting material for the preparation of NGPs is a graphitic material that may be selected from the group consisting of natural graphite, artificial graphite, graphite oxide, graphite fluoride, graphite fiber, carbon fiber, carbon nano-fiber, carbon nano-tube, mesophase carbon micro-bead (MCMB) or carbonaceous micro-sphere (CMS), soft carbon, hard carbon, and combinations thereof.

Graphite oxide may be prepared by dispersing or immersing a laminar graphite material (e.g., powder of natural flake graphite or synthetic graphite) in an oxidizing agent, typically a mixture of an intercalant (e.g., concentrated sulfuric acid) and an oxidant (e.g., nitric acid, hydrogen peroxide, sodium perchlorate, potassium permanganate) at a desired temperature (typically 0-70° C.) for a sufficient length of time (typically 30 minutes to 5 days). In order to reduce the time required to produce a precursor solution or suspension, one may choose to oxidize the graphite to some extent for a shorter period of time (e.g., 30 minutes) to obtain graphite intercalation compound (GIC). The GIC particles are then exposed to a thermal shock, preferably in a temperature range of 600-1,100° C. for typically 15 to 60 seconds to obtain exfoliated graphite or graphite worms, which are optionally (but preferably) subjected to mechanical shearing (e.g. using a mechanical shearing machine or an ultrasonicator) to break up the graphite flakes that constitute a graphite worm. The un-broken graphite worms or individual graphite flakes are then re-dispersed in water, acid, or organic solvent and ultra-sonicated to obtain a graphene polymer solution or suspension.

The pristine graphene material is preferably produced by one of the following three processes: (A) Intercalating the graphitic material with a non-oxidizing agent, followed by a thermal or chemical exfoliation treatment in a non-oxidizing environment; (B) Subjecting the graphitic material to a supercritical fluid environment for inter-graphene layer penetration and exfoliation; or (C) Dispersing the graphitic material in a powder form to an aqueous solution containing a surfactant or dispersing agent to obtain a suspension and subjecting the suspension to direct ultrasonication.

In Procedure (A), a particularly preferred step comprises (i) intercalating the graphitic material with a non-oxidizing agent, selected from an alkali metal (e.g., potassium, sodium, lithium, or cesium), alkaline earth metal, or an alloy, mixture, or eutectic of an alkali or alkaline metal; and (ii) a chemical exfoliation treatment (e.g., by immersing potassium-intercalated graphite in ethanol solution).

In Procedure (B), a preferred step comprises immersing the graphitic material to a supercritical fluid, such as carbon dioxide (e.g., at temperature T>31° C. and pressure P>7.4 MPa) and water (e.g., at T>374° C. and P>22.1 MPa), for a period of time sufficient for inter-graphene layer penetration (tentative intercalation). This step is then followed by a sudden de-pressurization to exfoliate individual graphene layers. Other suitable supercritical fluids include methane, ethane, ethylene, hydrogen peroxide, ozone, water oxidation (water containing a high concentration of dissolved oxygen), or a mixture thereof.

In Procedure (C), a preferred step comprises (a) dispersing particles of a graphitic material in a liquid medium containing therein a surfactant or dispersing agent to obtain a suspension or slurry; and (b) exposing the suspension or slurry to ultrasonic waves (a process commonly referred to as ultrasonication) at an energy level for a sufficient length of time to produce the separated nano-scaled platelets, which are pristine, non-oxidized NGPs.

NGPs can be produced with an oxygen content no greater than 25% by weight, preferably below 20% by weight, further preferably below 5%. Typically, the oxygen content is between 5% and 20% by weight. The oxygen content can be determined using chemical elemental analysis and/or X-ray photoelectron spectroscopy (XPS).

The laminar graphite materials used in the prior art processes for the production of the GIC, GO, and subsequently made exfoliated graphite, flexible graphite sheets, and graphene platelets were, in most cases, natural graphite. However, the present invention is not limited to natural graphite. The starting material may be selected from the group consisting of natural graphite, artificial graphite (e.g., highly oriented pyrolytic graphite, HOPG), graphite oxide, graphite fluoride, graphite fiber, carbon fiber, carbon nano-fiber, carbon nano-tube, mesophase carbon micro-bead (MCMB) or carbonaceous micro-sphere (CMS), soft carbon, hard carbon, and combinations thereof. All of these materials contain graphite crystallites that are composed of layers of graphene planes stacked or bonded together via van der Waals forces. In natural graphite, multiple stacks of graphene planes, with the graphene plane orientation varying from stack to stack, are clustered together. In carbon fibers, the graphene planes are usually oriented along a preferred direction. Generally speaking, soft carbons are carbonaceous materials obtained from carbonization of liquid-state, aromatic molecules. Their aromatic ring or graphene structures are more or less parallel to one another, enabling further graphitization. Hard carbons are carbonaceous materials obtained from aromatic solid materials (e.g., polymers, such as phenolic resin and polyfurfuryl alcohol). Their graphene structures are relatively randomly oriented and, hence, further graphitization is difficult to achieve even at a temperature higher than 2,500° C. But, graphene sheets do exist in these carbons.

The presently invented process typically resulted in nano graphene sheets that, when formed into a thin film with a thickness no greater than 100 nm, exhibits an electrical conductivity of at least 10 S/cm, often higher than 100 S/cm, and, in many cases, higher than 1,000 S/cm. The resulting NGP powder material typically has a specific surface area of from approximately 300 $m^2/g$ to 2,600 $m^2/g$ and, in many cases, comprises single-layer graphene or few-layer graphene sheets.

When these graphene sheets are combined with cathode active material particles to form graphene-enhanced particulates, these particulates (when packed into a dry electrode) exhibit an electrical conductivity no less than $10^{-4}$ S/cm (typically and preferably greater than $10^{-2}$ S/cm). The graphene component is in an amount of from 0.01% to 30% by weight (preferably between 0.1% to 20% by weight and more preferably between 0.5% and 10%) based on the total weight of graphene and the cathode active material combined. Preferably, the particulates are approximately spherical in shape.

Preferably, the cathode active material is selected from the group consisting of lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphates, metal sulfides, and combinations thereof. The cathode active material particles (primary particles) in the particulate (secondary particle) preferably have a dimension smaller than 1 μm and further preferably smaller than 100 nm. Smaller dimensions promote shorter lithium diffusion times and faster battery charge and discharge rates.

A particularly desirable group of cathode active materials consists of lithium iron phosphate, lithium manganese phosphate, lithium vanadium phosphate, lithium mixed metal phosphates, and combinations thereof, wherein the cathode active material contains sub-micron or nano-scaled particles with a size less than 1 μm, preferably <100 nm. This class of cathode active materials is relatively safe and is a preferred class of cathode active materials in the lithium ion batteries for electric vehicle applications.

Optionally, the particulate further comprises a carbon material in electronic contact with the cathode active material and a graphene sheet. This carbon material can be a polymeric carbon, amorphous carbon, chemical vapor deposition (CVD) carbon, carbon black (CB), acetylene black (AB), activated carbon, fine expanded graphite particle with a dimension smaller than 100 NM, artificial graphite particle, and/or natural graphite particle. Preferably, the carbon material is coated on at least one of the cathode active material particles and more preferably on the surface of all primary particles, which are than embraced by a graphene sheet or a plurality of graphene sheets.

The following examples serve to provide the best modes of practice for the present invention and should not be construed as limiting the scope of the invention.

Example 1

Graphene Oxide from Sulfuric Acid Intercalation and Exfoliation of MCMBs

MCMB 2528 microbeads were supplied by Alumina Trading, which was the U.S. distributor for the supplier, Osaka Gas Chemical Company of Japan. This material has a density of about 2.24 g/cm$^3$ with a median particle size of about 22.5. MCMB 2528 (10 grams) were intercalated with an acid solution (sulfuric acid, nitric acid, and potassium permanganate at a ratio of 4:1:0.05) for 48 hours. Upon completion of the reaction, the mixture was poured into deionized water and filtered. The intercalated MCMBs were repeatedly washed in a 5% solution of HCl to remove most of the sulphate ions. The sample was then washed repeatedly with deionized water until the pH of the filtrate was neutral. The slurry was dried and stored in a vacuum oven at 60° C. for 24 hours. The dried powder sample was placed in a quartz tube and inserted into a horizontal tube furnace pre-set at a desired temperature, 800° C. for 30 seconds to obtain Sample 1. A small quantity of each sample was mixed with water and ultrasonicated at 60 W power for 10 minutes to obtain a suspension. A small amount was sampled out, dried, and investigated with TEM, which indicated that most of the NGPs were between 1 and 10 layers.

The graphene-water suspension was used for subsequent preparation of a precursor mixture containing primary particles of a cathode active material.

Example 2

Oxidation and Exfoliation of Natural Graphite

Graphite oxide was prepared by oxidation of graphite flakes with sulfuric acid, sodium nitrate, and potassium permanganate at a ratio of 4:1:0.05 at 30° C. for 48 hours, according to the method of Hummers [U.S. Pat. No. 2,798,878, Jul. 9, 1957]. Upon completion of the reaction, the mixture was poured into deionized water and filtered. The sample was then washed with 5% HCl solution to remove most of the sulfate ions and residual salt and then repeatedly rinsed with deionized water until the pH of the filtrate was approximately 7. The intent was to remove all sulfuric and nitric acid residue out of graphite interstices. The slurry was dried and stored in a vacuum oven at 60° C. for 24 hours.

The dried, intercalated (oxidized) compound was exfoliated by placing the sample in a quartz tube that was inserted into a horizontal tube furnace pre-set at 1,050° C. to obtain highly exfoliated graphite. The exfoliated graphite was dispersed in water along with a 1% surfactant at 45° C. in a flat-bottomed flask and the resulting graphene oxide (GO) suspension was subjected to ultrasonication for a period of 15 minutes. The cathode active materials studied in this example include lithium cobalt oxide, lithium iron phosphate, and lithium mixed metal phosphate in a fine particle form.

For the preparation of graphene-enhanced particulates, an amount of a selected cathode active material powder was added to a desired amount of GO suspension to form a precursor mixture suspension with a solid content of approximately 10% by weight. After thorough mixing in an ultrasonication reactor, the suspension was then spray-dried to form the graphene-enhanced particulates.

Example 3

Preparation of Electrodes

Several dry electrodes containing graphene-enhanced particulates (comprising lithium cobalt oxide or lithium iron phosphate primary particles embraced by graphene sheets) were prepared by mixing the particulates with a liquid to form a paste without using a binder such as PVDF. The paste was cast onto a surface of a piece of glass, with the liquid medium removed to obtain a dry electrode (Sample 3a). Another dry electrode was prepared by directly mixing LiFePO$_4$ primary particles with graphene sheets in an identical liquid to form a paste without using a binder. Again, the paste was then cast to form a dry electrode (Sample 3b). The dry electrodes were for the evaluation of the effect of various conductive additives on the electrical conductivity of an electrode.

For comparison purposes, several additional dried electrodes were prepared under exactly identical conditions, and the paste in each case was made to contain the same cathode active particles, but a comparable amount of other conductive additives: multi-walled carbon nano-tubes (CNTs), carbon black (Super-P from Timcal), a CNT/Super-P mixture at an 1/1 ratio, and a GO/Super-P mixture at an 1/1 ratio. The electrical conductivity of various dry electrodes (cathodes) was measured and plotted as a function of the weight % of the additive in FIGS. 5(A) and 5(B).

Corresponding "wet" electrodes for incorporation in a battery cell were made to contain a PVDF binder. These electrodes were made into full cells containing graphite particles or lithium metal as an anode active material.

Figure 5A:
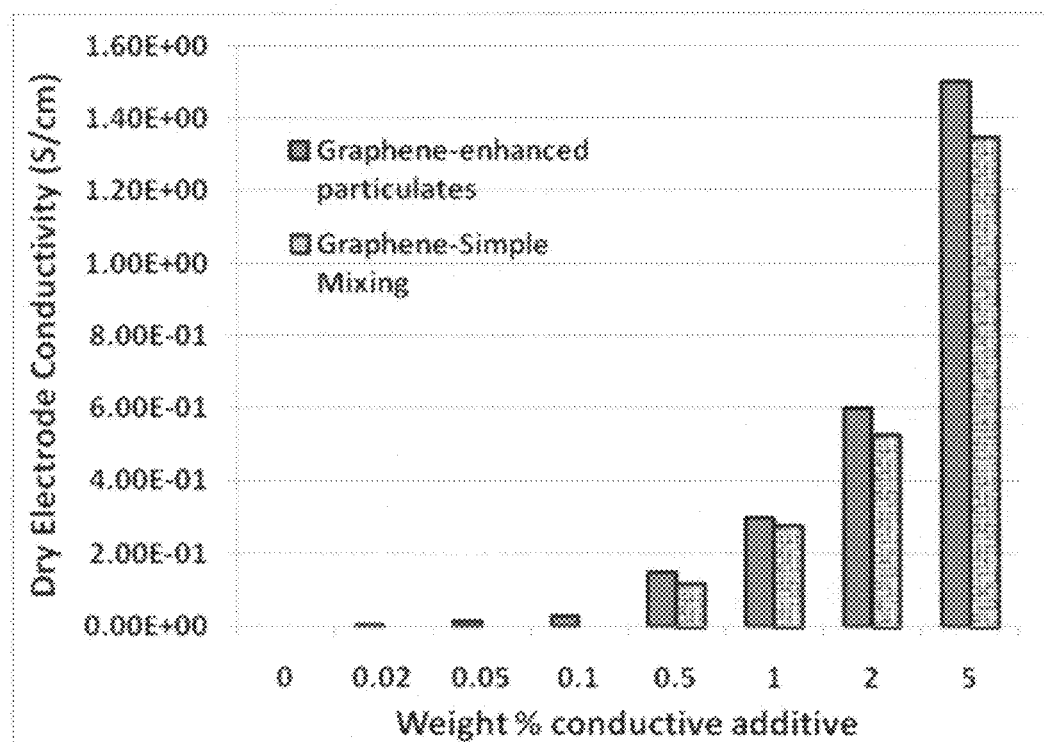
FIG. 5 (A) Electrical conductivity data of two dry electrodes, one containing presently invented graphene-enhanced particulates and the other containing a blend of LiFePO$_4$ particles and graphene sheets obtained by simple mixing of these two components; (B) Electrical conductivity data of three dry electrodes, one containing presently invented graphene-enhanced particulates, the second CNTs, and the third carbon black (Super-P from Timcal).

FIG. 5(A) clearly demonstrates that graphene sheets embracing the primary particles of a cathode active material help the electrode achieve a state of percolation (characterized by the formation of a 3-D network of electron-conducting paths) at a weight % as low as 0.02%, as opposed to the percolation threshold of 0.5% by weight for a dry electrode containing primary particles simply mixed with graphene. The CB graphite particles (Super-P) did not reach the point of percolation until about 3% by weight. Even at the same weight %, the graphene-enhanced particulates appear to provide higher conductivity to the electrode. These conductivity data clearly demonstrate that the graphene-enhanced particulate approach is a superior strategy for significantly improving the performance of a lithium battery electrode.

Figure 5B:
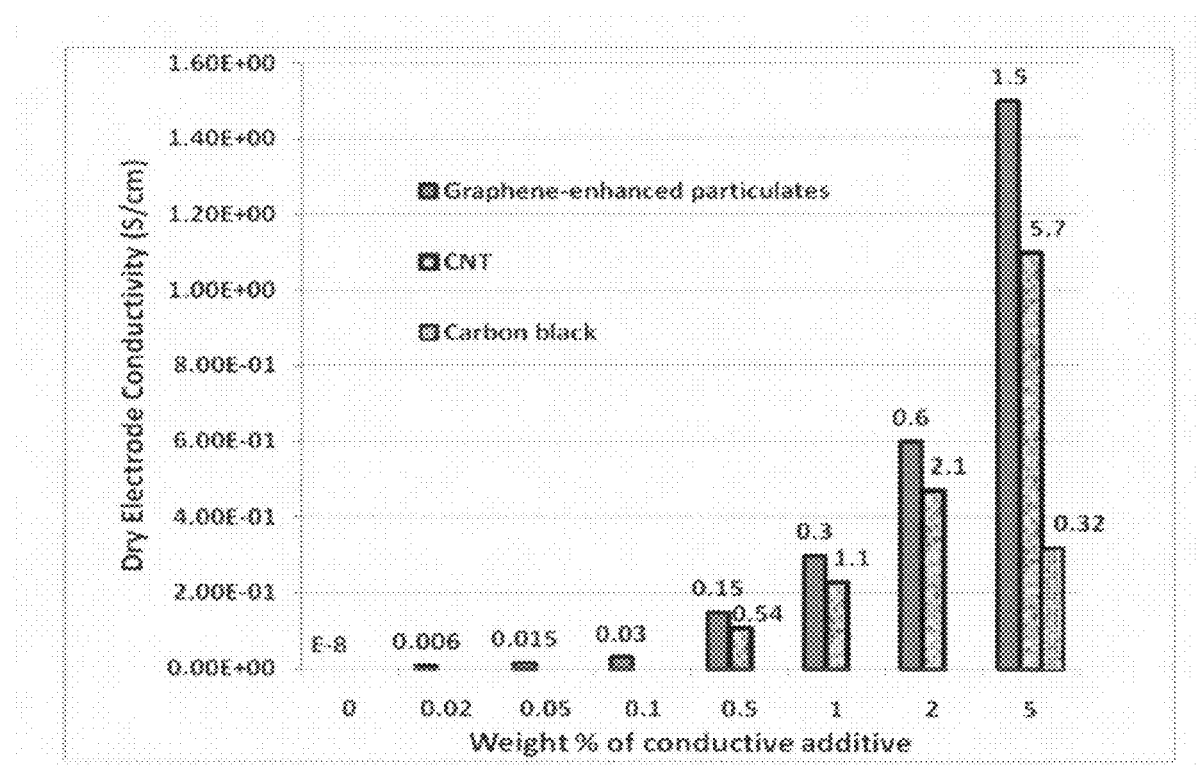

FIG. 5(B) shows that NGPs, when incorporated to form graphene-enhanced particulates of the present invention, provide exceptional electrical conductivity characteristics to the electrodes in terms of a much lower percolation threshold and higher electrical conductivity at a given weight % of additive as compared to the corresponding CNT-enhanced or carbon black-enhanced electrodes.

Table 1 below shows the superior performance of the presently invented graphene-enhanced particulates wherein the primary LiFePO$_4$ particles are pre-coated with carbon. These data show that NGPs, using the graphene-enhanced particulate approach, impart dramatically higher conductivity (by 60-fold) to the carbon-coated LiFePO$_4$ electrodes. The NGP-enhanced electrodes exhibit conductivity values that are 3-5 times higher than those of the electrodes containing 2% CNTs or carbon black (Super-P). These results are very surprising and could not have been predicted based on existing knowledge. No prior art work has shown electrode performance that is anywhere near what the present invention has achieved.

TABLE 1

Dimensions, resistance, and resistivity of several dry electrodes containing carbon-coated $LiFePO_4$ particles and various conductive additives (all at approximately 2%).

| | C-coated $LiFePO_4$ | C-coated $LiFePO_4$ + 2% Super-P | C-coated $LiFePO_4$ + 2% CNT | NGP-enhanced C-coated $LiFePO_4$ |
|---|---|---|---|---|
| Thickness/cm | 0.512 | 0.46 | 0.472 | 0.476 |
| Area/$cm^2$ | 5.22 | 5.635 | 4.29 | 6.175 |
| R (in plane)/$\Omega$ | 380 | 22 | 18 | 6 |
| R (though plane)/$\Omega$ | 19.5 | 1 | 2 | 0.25 |
| $\rho$ (in-plane resistivity)/$\Omega$ cm | 194 | 10.19 | 8.5 | 2.8 |
| $\rho$ (through plane)/$\Omega$ cm | 199 | 12.15 | 18.18 | 3.24 |

Figure 6:
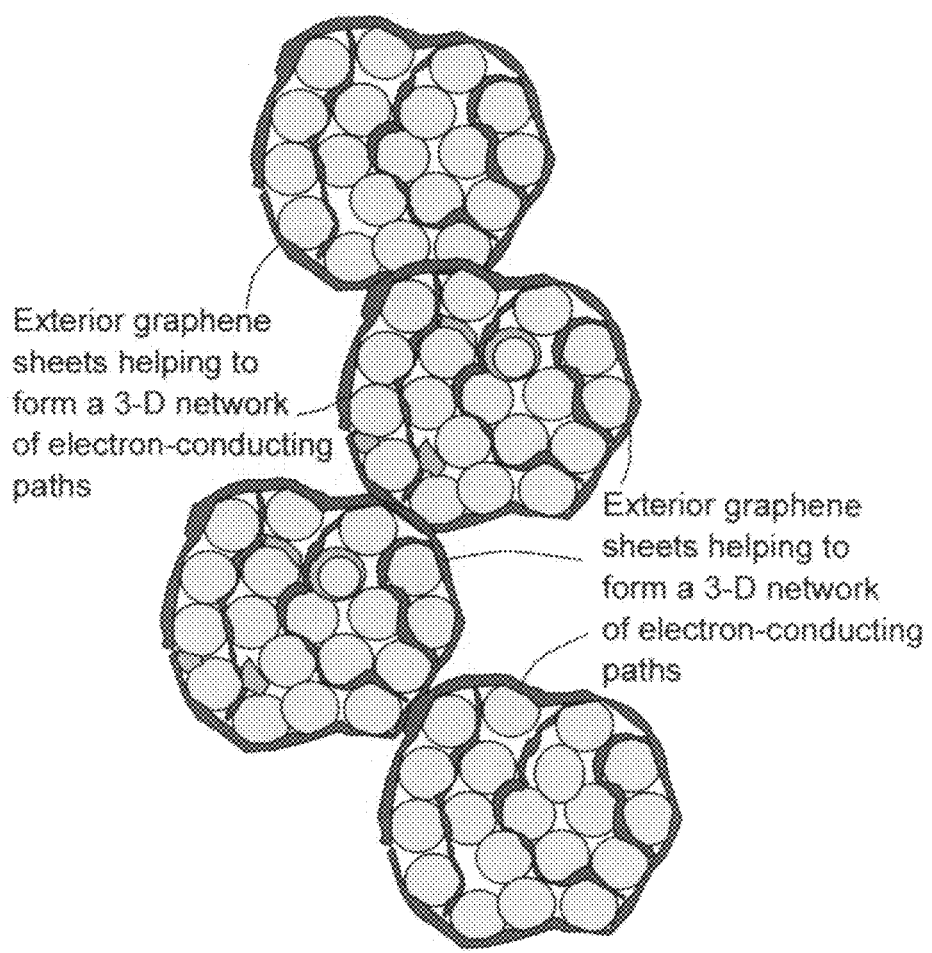
FIG. 6 A schematic illustrating that the graphene sheets disposed on the exterior surface of the particulates naturally form a 3-D network of electron-conducting paths when these particulates are packed together to form an electrode.

Not wishing to be limited by theory, but we feel that these surprising results might be due to the high electrical conductivity of graphene and, more importantly, the two-dimensional geometric nature of graphene sheets. As illustrated in FIG. 6, the graphene sheets disposed on the exterior surface of the particulates naturally form a 3-D network of electron-conducting paths when these particulates are packed together to form an electrode. This geometry-enabled advantage could not be achieved with carbon nano-tubes (1-D nano particles) and carbon black (essentially 0-D nano particles).

Figure 7:
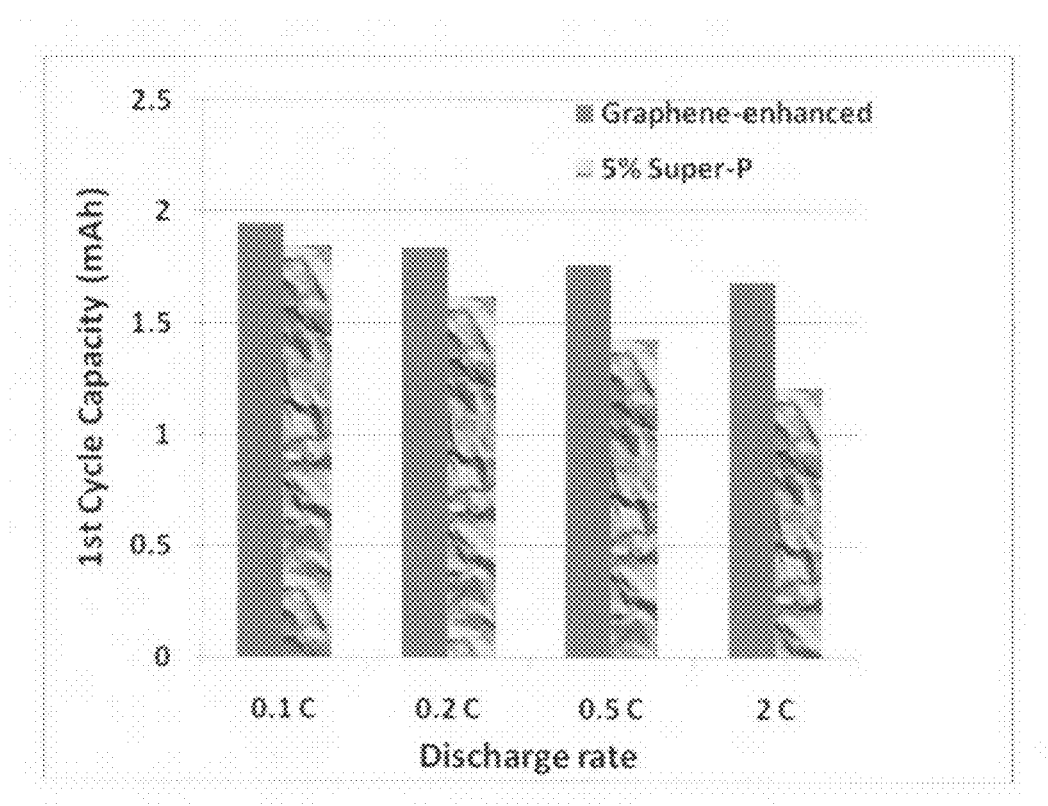
FIG. 7 The first-cycle capacity of two full cells containing a graphene-enhanced cathode and a carbon black-added cathode.

The first-cycle discharge capacity data of small full button cells containing lithium metal as an anode active material are shown in FIG. 7. The battery cells containing graphene-enhanced particulates in the cathode show superior rate capability to that of a carbon black-enhanced cathode.

It may be further noted that the cathode active material that can be used in the presently invented electrode is not limited to lithium cobalt oxide and lithium iron phosphate. There is no particular limitation on the type of electrode active materials that can be used.

Example 4

Solution Deposition of $Li_{1+x}Mn_yFe_zPO_4$ thin Coatings on Graphene Sheets (The Co-Precipitation Method)

$Li_{1+x}Mn_yFe_zPO_4$ nano particles (where $0<x\le0.3$, $0.5<y<0.95$, and $0.9<y+z\le1$) coated on graphene oxide sheets were successfully prepared by a solution deposition method using lithium acetate, manganese nitrate, and ammonium dihydrogen phosphate as starting materials. Stoichiometric lithium acetate ($Li(CH_3COO)\cdot 2H_2O$), manganese nitrate ($Mn(NO_3)_2$), and ammonium dihydrogen phosphate ($NH_4H_2PO_4$) were dissolved in 2-methoxyethanol ($CH_3OCH_2CH_2OH$). Then a small amount of concentrated nitric acid was added. Dust and other suspended impurities were removed from the solution by filtering through 0.2 mm syringe filter to form the $Li_{1+x}Mn_yFe_zPO_4$ precursor solution. In the process, the addition of concentrated nitric acid was a key step to form the precursor solution for $Li_{1+x}Mn_yFe_zPO_4$. Nitric acid significantly enhanced the solubility of $NH_4H_2PO_4$ in the mixture of solution (it was otherwise very difficult to dissolve $NH_4H_2PO_4$ in 2-methoxyethanol or other alcohol) and prevented the precipitation reaction between the reagents. The mostly single-layer graphene sheets produced in Example 2 were added to the precursor solution to enable co-precipitation. The resulting product was lithium mixed transition nano particle-coated GO sheets. Upon thermal reduction at 600° C. under an inert gas atmosphere, GO was converted to graphene. In this sample, nano particle-coated graphene sheets aggregate to form bulk material and must be reduced to fine particles through grinding (Sample 4A), similar to what Ding, et al did to their graphene sheets loaded with $LiFePO_4$ nano-particles discussed earlier [Y. Ding, et al. "Preparation of nano-structured $LiFePO_4$/graphene composites by co-precipitation method," Electrochemistry Communications 12 (2010) 10-13].

A separate batch of lithium mixed transition nano particles was prepared without the use of GO during precipitation. These particles were then added to a water suspension of GO and the resulting precursor suspension was subjected to spray-drying and thermal reduction to form graphene-enhanced particulates (Sample 4B).

The structure, surface morphology, and electrochemical behavior of the cathodes were studied by X-ray diffraction, scanning electron microscopy, cyclic voltammetry, conductivity measurements, and charge-discharge tests. The results showed that graphene-enhanced particulates containing $Li_{1+x}Mn_yFe_zPO_4$ primary particles (Sample 4B) possess a much higher conductivity (0.85 S/cm) than that (0.53 S/cm) of Sample 4A prepared by the conventional co-precipitation method, given the same graphene proportion (2.3% by weight). Sample 4B also has a much higher tap density (1.45 $g/cm^3$) than Sample 4A (1.01 $g/cm^3$).

Figure 8:
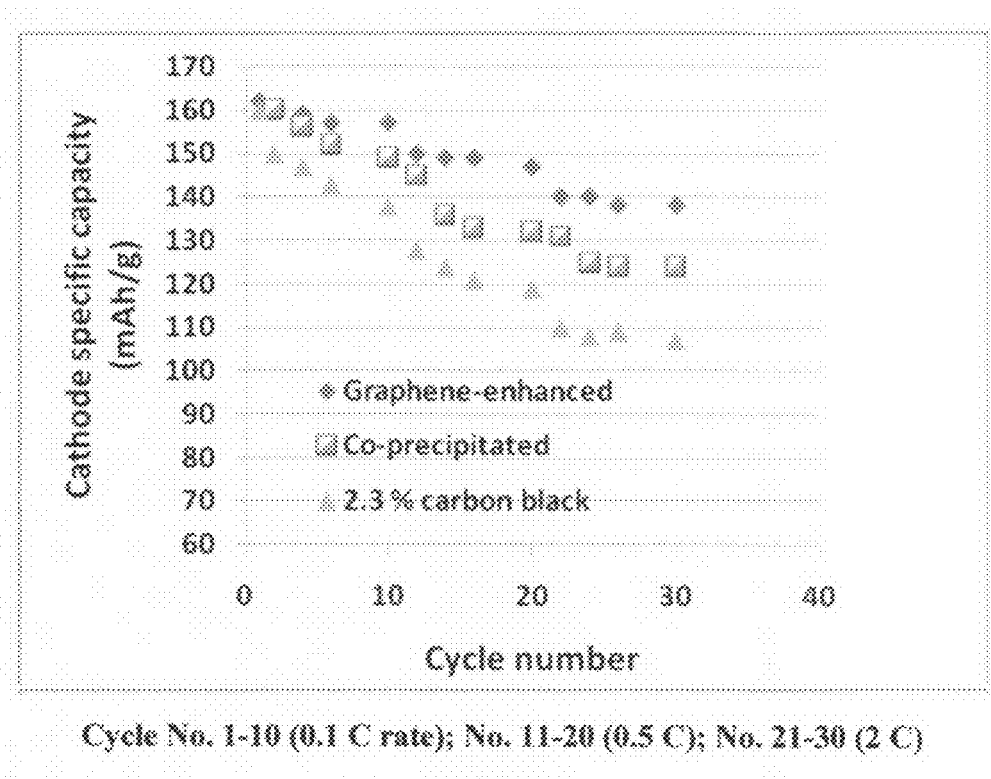
FIG. 8 The specific capacity responses as a function of the cycle number and discharge rate of Sample 4A (co-precipitated graphene-lithium mixed metal phosphate particles), Sample 4B (graphene-enhanced particulates), and a baseline sample containing the same phosphate particles with 2.3% carbon black as a conductive additive.

The specific capacity responses as a function of the cycle number and the discharge rate of Sample 4A, Sample 4B, and a baseline sample containing particles with 2.3% carbon black as a conductive additive, are plotted in FIG. 8. This chart demonstrates that Sample 4-B (featuring the graphene-enhanced particulates) exhibit the best performance over all discharge rates (0.1 C, 0.5 C, and 2 C), much better than the performance of the sample prepared with a co-precipitation method as suggested by Ding, et al. These data further confirm the superiority of the instant invention, which is clearly beyond and above what could be anticipated based on the results of any previous studies, alone or in combination.

The invention claimed is:

1. A nano graphene-enhanced particulate for use as a lithium battery cathode active material, wherein said nano graphene-enhanced particulate consists of a plurality of graphene sheets and a plurality of fine cathode active material particles with a size smaller than 10 μm, and the graphene sheets and the cathode active material particles are mutually bonded or agglomerated into said nano graphene-enhanced particulate with a at least one exterior graphene sheet embracing said nano graphene-enhanced particulate, and wherein said nano graphene-enhanced particulate has an electrical conductivity no less than 10−4 S/cm and said graphene is in an amount of from 0.01% to 30% by weight based on the total weight of graphene and the cathode active material particles combined.

2. The nano graphene-enhanced particulate of claim 1 wherein the amount of the graphene sheets is from 0.1% to 20% by weight of the total weight of graphene sheets and the cathode active material particles combined.

3. The nano graphene-enhanced particulate of claim 1 wherein the amount of the graphene sheets is from 0.5% to 10% by weight of the total weight of graphene sheets and the cathode active material particles combined.

4. The nano graphene-enhanced particulate of claim 1 wherein said particulate has an electrical conductivity greater than $10^{-2}$ S/cm.

5. The nano graphene-enhanced particulate of claim 1 wherein said particulate is spherical in shape.

6. The nano graphene-enhanced particulate of claim 1 wherein said graphene sheets comprises single-layer graphene or few-layer graphene, wherein said few-layer graphene is defined as a graphene platelet formed of less than 10 graphene planes.

7. The nano graphene-enhanced particulate of claim 1, wherein said cathode active material particles are selected from the group consisting of lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphates, metal sulfides, and combinations thereof.

8. The nano graphene-enhanced particulate of claim 1, wherein said cathode active material particles in the nano graphene-enhanced particulate have a dimension smaller than 1 μm.

9. The nano graphene-enhanced particulate of claim 1, wherein said cathode active material particles in the nano graphene-enhanced particulate have a dimension smaller than 100 nm.

10. The nano graphene-enhanced particulate of claim 1, wherein said cathode active material particles are selected from the group consisting of lithium iron phosphate, lithium manganese phosphate, lithium vanadium phosphate, lithium mixed metal phosphates, and combinations thereof and wherein said cathode active material contains sub-micron or nano-scaled particles with a size less than 1 μm.

11. The nano graphene-enhanced particulate of claim 1, wherein said cathode active material particles are selected from the group consisting of lithium iron phosphate, lithium manganese phosphate, lithium vanadium phosphate, lithium mixed metal phosphates, and combinations thereof and wherein said cathode active material contains sub-micron or nano-scaled particles with a size less than 100 nm.

12. The nano graphene-enhanced particulate of claim 1, further comprising a carbon material in electronic contact with said cathode active material particles and a graphene sheet.

13. The nano graphene-enhanced particulate of claim 1, further comprising a carbon material coated on at least one of said cathode active material particles, wherein said carbon material is selected from polymeric carbon, amorphous carbon, chemical vapor deposition carbon, carbon black, acetylene black, activated carbon, fine expanded graphite particle with a dimension smaller than 100 nm, artificial graphite particle, natural graphite particle, or a combination thereof.

14. The nano graphene-enhanced particulate of claim 1, wherein said particulate is prepared from a process comprising: (a) Preparing a precursor mixture of graphene or graphene precursor with a cathode active material or active material precursor; and (b) Thermally and/or chemically converting said precursor mixture to said graphene-enhanced cathode particulate.

15. The nano graphene-enhanced particulate of claim 14, wherein said step of preparing a precursor mixture comprises preparing a suspension of graphene or graphene precursor in a liquid medium and mixing a cathode active material or active material precursor in said suspension to form a multi-component suspension.

16. The nano graphene-enhanced particulate of claim 15, wherein the process further comprises a step of drying said multi-component suspension to form said precursor mixture.

17. The nano graphene-enhanced particulate of claim 15, wherein the process further comprises a step of drying said multi-component suspension to form said precursor mixture using a spray-drying, spray-pyrolysis, or fluidized-bed drying procedure.

18. The nano graphene-enhanced particulate of claim 14, wherein said step of converting comprises a sintering, heat-treatment, spray-pyrolysis, or fluidized bed drying or heating procedure.

19. The nano graphene-enhanced particulate of claim 14, wherein said step of converting comprises a procedure of chemically or thermally reducing said graphene precursor to reduce or eliminate oxygen content and other non-carbon elements of said graphene precursor.

20. The nano graphene-enhanced particulate of claim 14, wherein said graphene precursor contains graphene oxide or graphene fluoride.

21. The nano graphene-enhanced particulate of claim 1 wherein said graphene sheets in said particulate have an oxygen content less than 25% by weight.

22. The nano graphene-enhanced particulate of claim 1 wherein said graphene sheets in said particulates have an oxygen content less than 5% by weight.

23. The nano graphene-enhanced particulate of claim 1 wherein said graphene sheets in said particulates have an oxygen content in the range of 5% to 25% by weight.

24. The nano graphene-enhanced particulate of claim 14, wherein said step of preparing said precursor mixture comprises: A) dispersing or exposing a laminar graphite material in a fluid of an intercalant and/or an oxidant to obtain a graphite intercalation compound (GIC) or graphite oxide (GO); B) exposing the resulting GIC or GO to a thermal shock at temperature for a period of time sufficient to obtain exfoliated graphite or graphite worms; C) dispersing the exfoliated graphite or graphite worms in a liquid medium containing an acid, an oxidizing agent, and/or an organic solvent at a desired temperature for a duration of time until the exfoliated graphite is converted into a graphene oxide dissolved in the liquid medium to form a graphene solution; and D) adding a desired amount of said cathode precursor material to said graphene solution to form said precursor mixture in a suspension, slurry or paste form.

25. The nano graphene-enhanced particulate of claim 14, wherein said step of preparing said precursor mixture comprises: (a) preparing a suspension containing pristine nano graphene platelets (NGPs) dispersed in a liquid medium; (b) adding an acid and/or an oxidizing agent into said suspension at a temperature for a period of time sufficient to obtain a graphene solution or suspension; and (c) adding a desired amount of cathode active material or precursor in the graphene solution or suspension to form a paste or slurry.

26. A lithium battery cathode comprising multiple nano graphene-enhanced particulates of claim 1.

27. A lithium battery cathode comprising multiple nano graphene-enhanced particulates of claim 13.

28. A lithium battery cathode comprising multiple nano graphene-enhanced particulates of claim 1, wherein said multiple nano graphene-enhanced particulates are packed together with graphene sheets forming a three-dimensional electron-conducting pathway.

29. A lithium battery cathode comprising multiple nano graphene-enhanced particulates of claim 13, wherein said multiple nano graphene-enhanced particulates are packed together with graphene sheets and said carbon material together forming a three-dimensional electron-conducting pathway.

30. A lithium battery comprising an anode, a lithium battery cathode of claim 26, a separator disposed between the anode and the cathode, and electrolyte in physical contact with both the anode and the cathode.

31. A lithium battery comprising an anode, a lithium battery cathode of claim 27, a separator disposed between the anode and the cathode, and electrolyte in physical contact with both the anode and the cathode.

32. A lithium battery comprising an anode, a lithium battery cathode of claim 28, a separator disposed between the anode and the cathode, and electrolyte in physical contact with both the anode and the cathode.

33. A lithium battery comprising an anode, a lithium battery cathode of claim 29, a separator disposed between the anode and the cathode, and electrolyte in physical contact with both the anode and the cathode.

* * * * *